United States Patent
Guo et al.

(10) Patent No.: US 11,837,950 B2
(45) Date of Patent: Dec. 5, 2023

(54) SWITCHING POWER SUPPLY AND ELECTRONIC DEVICE

(71) Applicant: Huayuan semiconductor (shenzhen) limited company, Shenzhen (CN)

(72) Inventors: Chunming Guo, Shenzhen (CN);
Zhiwei Qiu, Shenzhen (CN);
Chenglong Zhang, Shenzhen (CN)

(73) Assignee: HUAYUAN SEMICONDUCTOR (SHENZHEN) LIMITED COMPANY, Shenzhen (CN)

( * ) Notice: Subject to any disclaimer, the term of this patent is extended or adjusted under 35 U.S.C. 154(b) by 0 days.

(21) Appl. No.: 17/434,295

(22) PCT Filed: Dec. 10, 2020

(86) PCT No.: PCT/CN2020/135487
§ 371 (c)(1),
(2) Date: Aug. 26, 2021

(87) PCT Pub. No.: WO2022/077751
PCT Pub. Date: Apr. 21, 2022

(65) Prior Publication Data
US 2023/0308010 A1    Sep. 28, 2023

(30) Foreign Application Priority Data
Oct. 15, 2020 (CN) .......................... 202011102435.9

(51) Int. Cl.
*H02M 1/34* (2007.01)
*H02M 3/335* (2006.01)
*H02M 1/00* (2006.01)

(52) U.S. Cl.
CPC ........... *H02M 1/34* (2013.01); *H02M 1/0006* (2021.05); *H02M 3/33507* (2013.01);
(Continued)

(58) Field of Classification Search
CPC ............. H02M 1/0006; H02M 1/0048; H02M 1/0054; H02M 1/34; H02M 1/342;
(Continued)

(56) References Cited

U.S. PATENT DOCUMENTS 5,883,795 A * 3/1999 Farrington ........ H02M 3/33538
363/21.04
9,544,953 B2 * 1/2017 Kang ....................... H02H 3/20
(Continued)

*Primary Examiner* — Thienvu V Tran
*Assistant Examiner* — Shahzeb K Ahmad
(74) *Attorney, Agent, or Firm* — NZ CARR LAW OFFICE

(57) ABSTRACT

The invention provides a switching power supply and an electronic device, comprising an active clamp circuit and a transformer, the active clamp circuit including a first clamp capacitor, a second clamp capacitor, and a path guiding module that is connected at two terminals of the first clamp capacitor and two terminals of the second clamp capacitor respectively; the path guiding module, the first and the second clamp capacitors are all directly or indirectly connected to a primary side of the transformer; the path guiding module is configured to guide the first and the second clamp capacitors to obtain an electric energy from different positions on the primary side of the transformer in a first time period, and to guide the first and the second clamp capacitors to discharge the primary side of the transformer after being connected in parallel with each other in a second time period.

20 Claims, 9 Drawing Sheets

(52) U.S. Cl.
CPC ... *H02M 3/33561* (2013.01); *H02M 3/33576* (2013.01); *H02M 1/342* (2021.05)

(58) Field of Classification Search
CPC .. H02M 1/344; H02M 3/335; H02M 3/33507; H02M 3/33523; H02M 3/33538; H02M 3/33553; H02M 3/33561; H02M 3/33571; H02M 3/33576; H02M 3/337
See application file for complete search history.

(56) References Cited

U.S. PATENT DOCUMENTS

| | | | |
|---|---|---|---|
| 9,780,642 B2* | 10/2017 | Skinner | H02M 3/33507 |
| 2011/0057639 A1* | 3/2011 | Chung | H02M 1/34 |
| | | | 323/311 |
| 2016/0365801 A1* | 12/2016 | Phadke | H02M 3/33569 |
| 2018/0069478 A1* | 3/2018 | Phadke | H02M 3/33507 |
| 2020/0244175 A1* | 7/2020 | Mahdavikhah-Mehrabad | H02M 3/33569 |

* cited by examiner

SWITCHING POWER SUPPLY AND ELECTRONIC DEVICE

CROSSREFERENCE TO THE RELATED APPLICATIONS

This application is based upon and claims priority to Chinese Patent Application No. 202011102435.9, filed on Oct. 15, 2020, the entire contents of which are incorporated herein by reference.

TECHNICAL FIELD

The present invention relates to a switching power supply, in particular, to a switching power supply and an electronic device.

BACKGROUND

Switch power supplies are widely used in AC-DC (AC/DC) and DC-DC (DC/DC) conversion, and provide insulation isolation between the input side and the output side. Such as flyback switching power supply or forward switching power supply.

In the prior art, the switching power supply can be provided with a transformer and an active clamp circuit. In the active clamp circuit, the leakage inductance energy of the transformer can be stored by the clamp capacitor and sent back to the transformer.

However, when an existing active clamp circuit is used, a problem of excessive current in the output diode connected to the clamp switch and/or the secondary side of the transformer in the active clamp circuit may be caused, which may cause problems such as damages on the clamp switch and output diode. Specifically, for example, in terms of the synchronous rectifiers for the secondary rectifiers, the active clamp may cause premature shutdown of the synchronous rectifiers, thereby reducing efficiency or causing damage to the common problem of the primary and secondary MOS transistors.

SUMMARY

The present invention provides a switching power supply and an electronic device, so as to solve the problem of damages on the clamp switch and the output diode.

According to a first aspect of the present invention, a switching power supply is provided, including an active clamp circuit and a transformer, the active clamp circuit comprising a first clamp capacitor and a second clamp capacitor, wherein the active clamp circuit further comprises a path guiding module; the path guiding module is connected at two terminals of the first clamp capacitor and two terminal of the second clamp capacitor respectively; the path guiding module, the first clamp capacitor, and the second clamp capacitor are all connected to a primary side of the transformer;

the path guiding module is configured to:

guide the first clamp capacitor and the second clamp capacitor to obtain an electric energy from different positions on the primary side of the transformer in a first time period;

guide the first clamp capacitor to discharge the primary side of the transformer after being connected in parallel with the second clamp capacitor in a second time period.

Optionally, the active clamp circuit further comprises a clamp switch, and the primary side of the transformer comprises a first leakage inductance, a first primary winding, a second leakage inductance, and a second primary winding that are connected in sequence;

a first terminal of the first clamp capacitor is connected to an terminal of the first leakage inductance away from the first primary winding, a second terminal of the second clamp capacitor is connected to a first terminal of the clamp switch, a second terminal of the clamp switch is connected to an terminal of the second primary winding away from the second leakage inductance, and the path guiding module is connected to an terminal of the second leakage inductance away from the second primary winding;

the path guiding module is specifically configured to:

guide the first clamp capacitor to obtain the electric energy from the first leakage inductance and the first primary winding and to guide the second clamp capacitor to obtain the electric energy from the second leakage inductance and the second primary winding in the first time period;

guide the first clamp capacitor to discharge the first leakage inductance, the first primary winding, the second leakage inductance and the second primary winding after being connected in parallel with the second clamp capacitor in the second time period.

Optionally, the path guiding module comprises a first diode and a second diode;

the first terminal of the first clamp capacitor is connected to the terminal of the first leakage inductance away from the first primary winding, a cathode of the first diode is connected to a second terminal of the first clamp capacitor, an anode of the first diode is connected to a cathode of the second diode, the cathode of the second diode is further connected to the terminal of the second leakage inductance away from the second primary winding, an anode of the second diode is connected to a first terminal of the second clamp capacitor, the second terminal of the second clamp capacitor is connected to the first terminal of the clamp switch, and the second terminal of the clamp switch is connected to the terminal of the second primary winding away from the second leakage inductance.

Optionally, the path guiding module further comprises a third diode and a fourth diode;

an anode of the third diode is connected to the first terminal of the first clamp capacitor, a cathode of the third diode is connected to the first terminal of the second clamp capacitor, an anode of the fourth diode is connected to the second terminal of the first clamp capacitor, and a cathode of the fourth diode is connected to the second terminal of the second clamp capacitor.

Optionally, the switching power supply further comprises a main switch and a controller, wherein a first terminal of the main switch is connected to a second terminal of the second primary winding, a second terminal of the main switch is grounded, and an output terminal of the controller is connected to a control terminal of the main switch and a control terminal of the clamp switch;

in the first time period, the main switch is turned off, the clamp switch is turned off, and an excitation energy on the primary side of the transformer is not completely released;

in the second time period, the main switch is turned off, the clamp switch is turned on, and the excitation energy on the primary side of the transformer has been completely released.

Optionally, when in a continuous conduction mode (CCM), the controller is configured to:

control the main switch to turn off when the clamp switch is turned off, wait for a delay time period, and then control the clamp switch to turn on, the first time period being a time period for waiting for the delay time period.

Optionally, when in a discontinuous conduction mode (DCM), the controller is configured to:

control the main switch to turn off when the clamp switch is turned off, and to control the clamp switch to turn on when a source-drain voltage of the main switch reaches an N-th peak value, wherein N is an integer greater than or equal to 1, the first time period being a time period in which the excitation energy on the primary side of the transformer is not completely released in a time period after the main switch is turned off and before the clamp switch is turned on.

Optionally, the controller is configured to:

control the clamp switch to turn off if it is detected that voltages of the first clamp capacitor and the second clamp capacitor drop to a target voltage when the main switch is turned off and the clamp switch is turned on; the target voltage matches half of a secondary reflected voltage.

Optionally, the transformer further comprises a secondary winding, and the secondary winding is sandwiched between the first primary winding and the second primary winding to form a sandwich winding transformer.

Optionally, the switching power supply is a flyback switching power supply or a forward switching power supply.

According to a second aspect of the present invention, an electronic device is provided, including the switching power supply involved in the first aspect and optional solutions thereof.

In the switching power supply and the electronic device, by introducing the path guide module in the active clamp circuit and using two clamp capacitors, the two clamp capacitors may be discharged in parallel when the active clamp circuit is discharged, which effectively limits the current during discharge and avoids or reduces the damage of the device caused by excessive pulse current.

At the same time, compared with the solution in which the electric energy is obtained from a circuit position of the transformer after two clamp capacitors are connected in series (e.g., after two capacitors are connected in series, the electric energy is obtained from a single leakage inductance and winding), the two clamp capacitors in the present invention obtain electric energy from different positions respectively, so as to further facilitate reducing the selection requirement of the clamp capacitor.

For example, since the two are not connected in series to obtain the electric energy, there is no need to choose a clamp capacitor with equal capacity due to the consideration of equalizing voltage division. For another example, in a further solution, since the two clamp capacitors obtain the electric energy from the leakage inductance of different primary windings, the voltage experienced by each clamp capacitor during charging may reach a lower level compared with the solution of obtaining the electric energy after series connection; therefore, the two clamp capacitors need not to select capacitors with the ability of withstanding higher voltages.

BRIEF DESCRIPTION OF THE DRAWINGS

To describe the technical solutions in the embodiments of the present invention or in the prior art more clearly, accompanying drawings required to describe the embodiments or the prior art are briefly described below. It is obvious that the accompanying drawings described below are only some embodiments of the present invention. It is apparent to those of ordinary skill in the art that other drawings may be further obtained based on the accompanying drawings without inventive effort.

DESCRIPTION OF REFERENCE NUMERALS

1—active clamp circuit;
11—path guiding module;
12,S2—clamp switch;
2—transformer;
3,S1—main switch;
4—controller;
C1—first clamp capacitor;
C2—second clamp capacitor;
C3—output capacitor;
D1—first diode;
D2—second diode;
D3—third diode;
D4—fourth diode;
D5—output diode;
P1—first primary winding;
P2—second primary winding;
S—secondary winding;
L1—first leakage inductance;
L2—second leakage inductance.

DETAILED DESCRIPTION OF THE EMBODIMENTS

The technical solutions in the embodiments of the present invention will be clearly and completely described hereafter in combination with the drawings in the embodiments of the present invention. It is apparent that the described embodiments are only a part of the embodiments of the present invention, but not the whole. Based on the embodiments of the present invention, all the other embodiments obtained by those of ordinary skill in the art without inventive effort are within the scope of the present invention.

Terms "first", "second", "third", "fourth", and the like (if any) in the specification and claims of the present invention and the foregoing accompanying drawings are used to distinguish similar objects, but do not need to be used for describing a specific sequence or an order. It should be understood that data used in this way can be interchanged under appropriate circumstances, so that the embodiments of the present invention described herein can be implemented in an order other than those illustrated or described herein. In addition, terms "including", "having", and any variations thereof are intended to cover non-exclusive inclusions, for example, processes, methods, systems, products, or devices that contain a series of steps or units need not be limited to those clearly listed steps or units, but may include other steps or units not explicitly listed or inherent to these processes, methods, products, or devices.

The technical solutions of the present invention are described in detail below with reference to the specific embodiments. The following several embodiments may be combined with each other, and a same or similar concept or process may not be described again in some embodiments.

Figure 1:
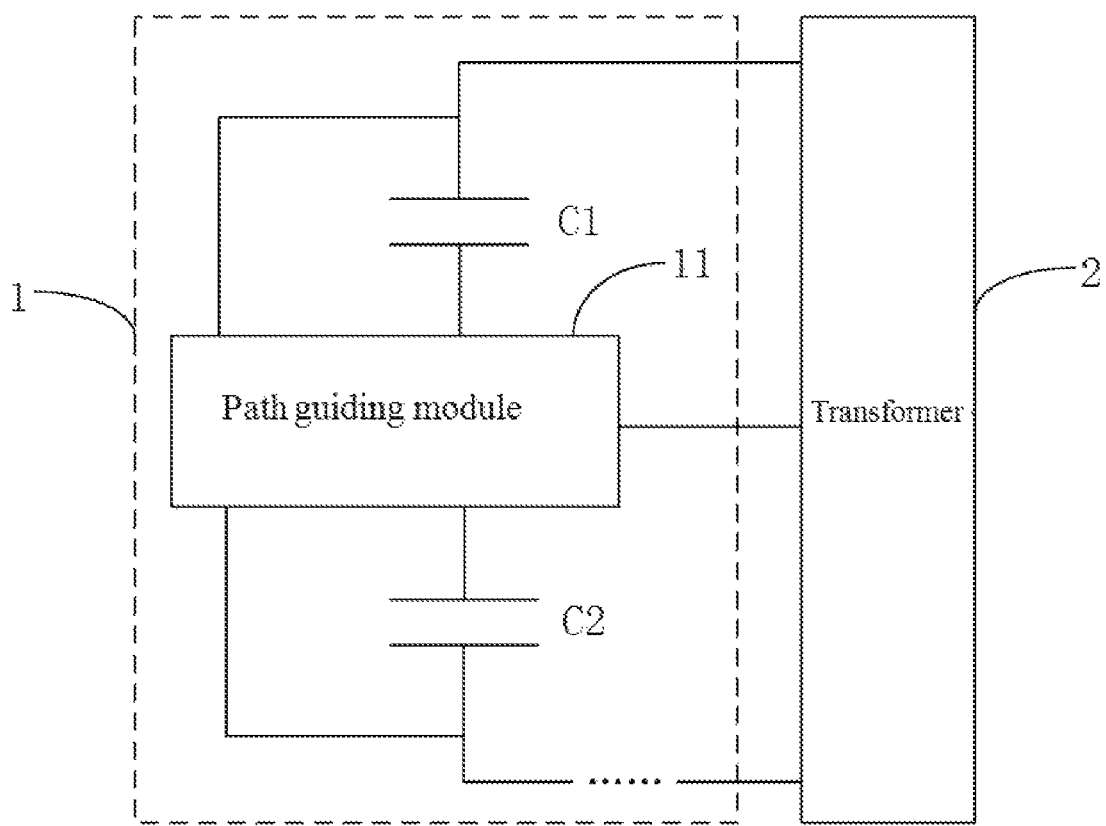
FIG. 1 is a structural schematic diagram 1 of a switching power supply in an embodiment of the present invention.
Figure 2:
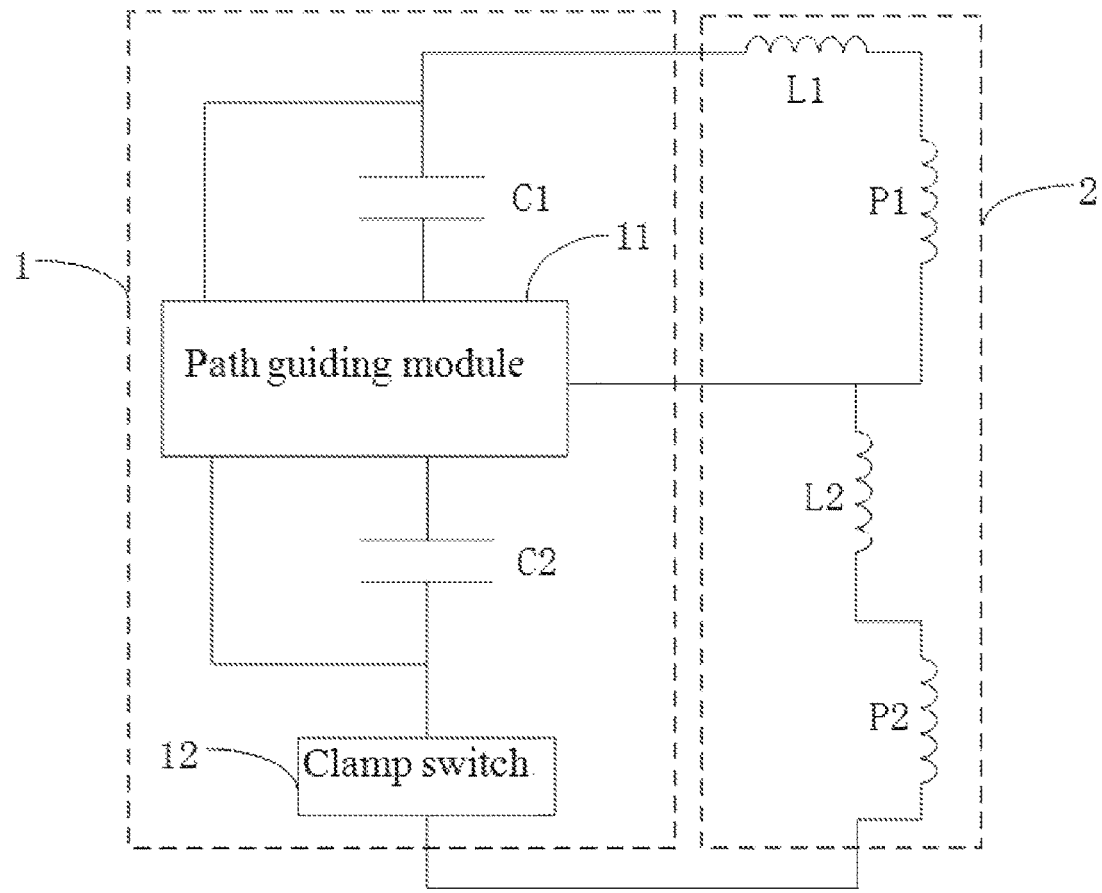
FIG. 2 is a structural schematic diagram 2 of a switching power supply in an embodiment of the present invention.

With reference to FIG. 1, a switching power supply comprises an active clamp circuit 1 and a transformer 2, the active clamp circuit 1 including a first clamp capacitor C1 and a second clamp capacitor C2, and further comprises a path guiding module 11.

The switching power supply may be a flyback switching power supply or a forward switching power supply. Since the active clamp circuit 1 is used, the power supply may be considered as a high-efficiency flyback power supply and forward power supply, wherein the leakage inductance energy of the transformer may be sent back to the primary circuit or the secondary output instead of being wasted like a normal flyback circuit. In addition, a zero voltage (ZVS) soft switching of the main pipe and the auxiliary pipe may be realized, which reduces the switching loss and improves the efficiency.

The path guiding module 11 is connected at two terminals of the first clamp capacitor C1 and two terminals of the second clamp capacitor C2 respectively; the path guiding module 11, the first clamp capacitor C1, and the second clamp capacitor C2 are all directly or indirectly connected to a primary side of the transformer 2.

The path guiding module 11 is configured to:

guide the first clamp capacitor C1 and the second clamp capacitor C2 to obtain an electric energy from different positions on the primary side of the transformer in a first time period;

guide the first clamp capacitor C1 to discharge the primary side of the transformer 2 after being connected in parallel with the second clamp capacitor C2 in a second time period.

The different positions may be understood as: both circuit positions may provide electrical energy, and the sources of electrical energy are different or differentiated. In specific examples, the electric energy obtained at different locations may be obtained from different windings and leakage inductances on the primary side, for example.

In the above solutions, by introducing the path guide module in the active clamp circuit and using two clamp capacitors, the two clamp capacitors may be discharged in parallel when the active clamp circuit is discharged, which effectively limits the current during discharge and avoids or reduces the damage of the device caused by excessive pulse current.

In view of this excessive pulsed current, in the existing related technology, in the switching power supply, the clamp switch and the main switch (for example, the main switch S1 and the clamp switch S2 shown in FIGS. 6 to 9) are complementary switches, which may realize the zero voltage switching (ZVS) of the clamp switch and the main switch, and the resonance of the leakage inductance in the transformer and the clamp capacitor in the active clamp circuit may send leakage inductance energy to the secondary. The above is the operation of active clamp flyback (ACF).

In the existing related art, in order to reduce standby power consumption and improve efficiency, generally, the operation will be switched from ACF to DCM at light load, and switched from DCM to ACF at heavier load, so as to improve efficiency. However, the first pulse of the conversion from DCM to ACF has the problem of large pulse currents in the clamp switch and output capacitor (i.e., the capacitor connected to the secondary winding of the transformer), and there is a risk of damage to the clamp switch and output capacitor; if the timing control is not good, the clamp switch and the output capacitor may be common and bear damage. It can be seen that in the embodiment of the present invention, this risk may be avoided or reduced.

At the same time, in the embodiment of the present invention, compared with the solution in which the electric energy is obtained from a circuit position of the transformer after two clamp capacitors are connected in series (e.g., after two capacitors are connected in series, the electric energy is obtained from a single leakage inductance and winding), the two clamp capacitors in the embodiment of the present invention obtain electric energy from different positions respectively, so as to further facilitate reducing the selection requirement of the clamp capacitor. Since the two clamp capacitors are not connected in series to obtain the electric energy, there is no need to select clamp capacitors of equal capacity due to the consideration of balanced voltage division.

In an embodiment, with reference to FIGS. 2 to 5, the active clamp circuit 1 further comprises a clamp switch 12 (i.e., the clamp switch S2 shown in FIGS. 6 to 9), and the primary side of the transformer 2 comprises a first leakage inductance L1, a first primary winding P1, a second leakage inductance L2, and a second primary winding P2 that are connected in sequence;

A first terminal of the first clamp capacitor C1 is connected to an terminal of the first leakage inductance L1 away from the first primary winding P1, a second terminal of the second clamp capacitor C2 is connected to a first terminal of the clamp switch 12, a second terminal of the clamp switch 12 is connected to an terminal of the second primary winding P2 away from the second leakage inductance L2, and the path guiding module 11 is connected to an terminal of the second leakage inductance away from the second primary winding;

the path guiding module 11 is specifically configured to:

guide the first clamp capacitor to obtain the electric energy from the first leakage inductance and the first primary winding and to guide the second clamp capacitor to obtain the electric energy from the second leakage inductance and the second primary winding in the first time period;

guide the first clamp capacitor to discharge the first leakage inductance, the first primary winding, the second leakage inductance and the second primary winding after being connected in parallel with the second clamp capacitor in the second time period.

In the above solution, since the two clamp capacitors obtain the electric energy from the leakage inductance of different primary windings, the voltage experienced by each clamp capacitor during charging may reach a lower level compared with the solution of obtaining the electric energy after series connection; therefore, the two clamp capacitors need not to select capacitors with the ability of withstanding higher voltages.

In comparison, if the solution of "obtaining the electric energy from a single leakage inductance and winding after two capacitors in series" is adopted, the two clamp capacitors have to be configured to have the same capacity (if not equal, it will cause different voltage divisions). In this circuit, in order to reduce the volume, chip ceramic capacitors are generally used. Considering that the capacity of this capacitor will be affected by the voltage resistance and temperature, the voltage resistance should be at least 250V or more.

Figure 3A:
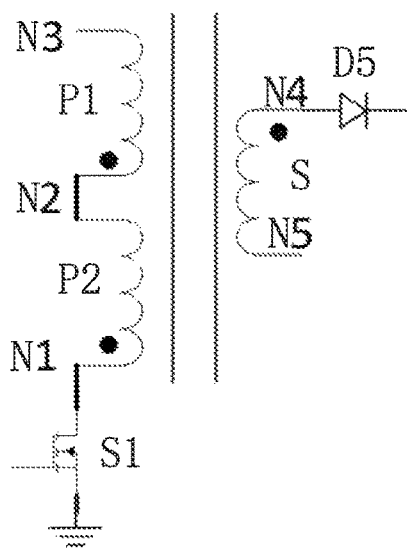
FIGS. 3a and 3b are structural schematic diagrams of a transformer in an embodiment of the present invention.
Figure 3B:
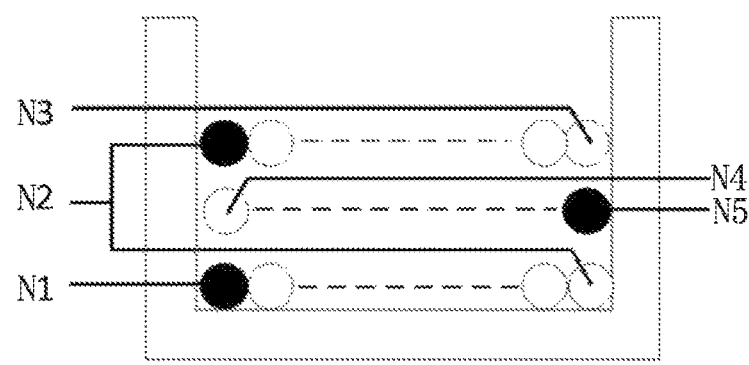

In an embodiment, with reference to FIGS. 3a and 3b, the transformer 2 further comprises a secondary winding S, and the secondary winding S is sandwiched between the first primary winding P1 and the second primary winding P2 to form a sandwich winding transformer. The connecting terminal N2 and the connecting terminal N3 are the two terminals of the first primary winding P1, the connecting terminal N1 and the connecting terminal N2 are the two terminals of the second primary winding P2, the connecting terminal N4 and the connecting terminal N5 are two terminals of the secondary winding S, and the secondary winding S may be connected to an output diode D5.

In the above solution, with combination of the configuration of the active clamp circuit and the sandwich winding transformer, the requirements on the voltage resistance of the clamp capacitor may be effectively reduced, based on which, for example, a capacitor of 100V or more may be used. At the same time, the above sandwich winding transformer may be mainly used for active clamp flyback scenarios with larger power (for example, application scenarios above 45 W), but embodiments applied to other scenarios are not excluded.

Figure 4:
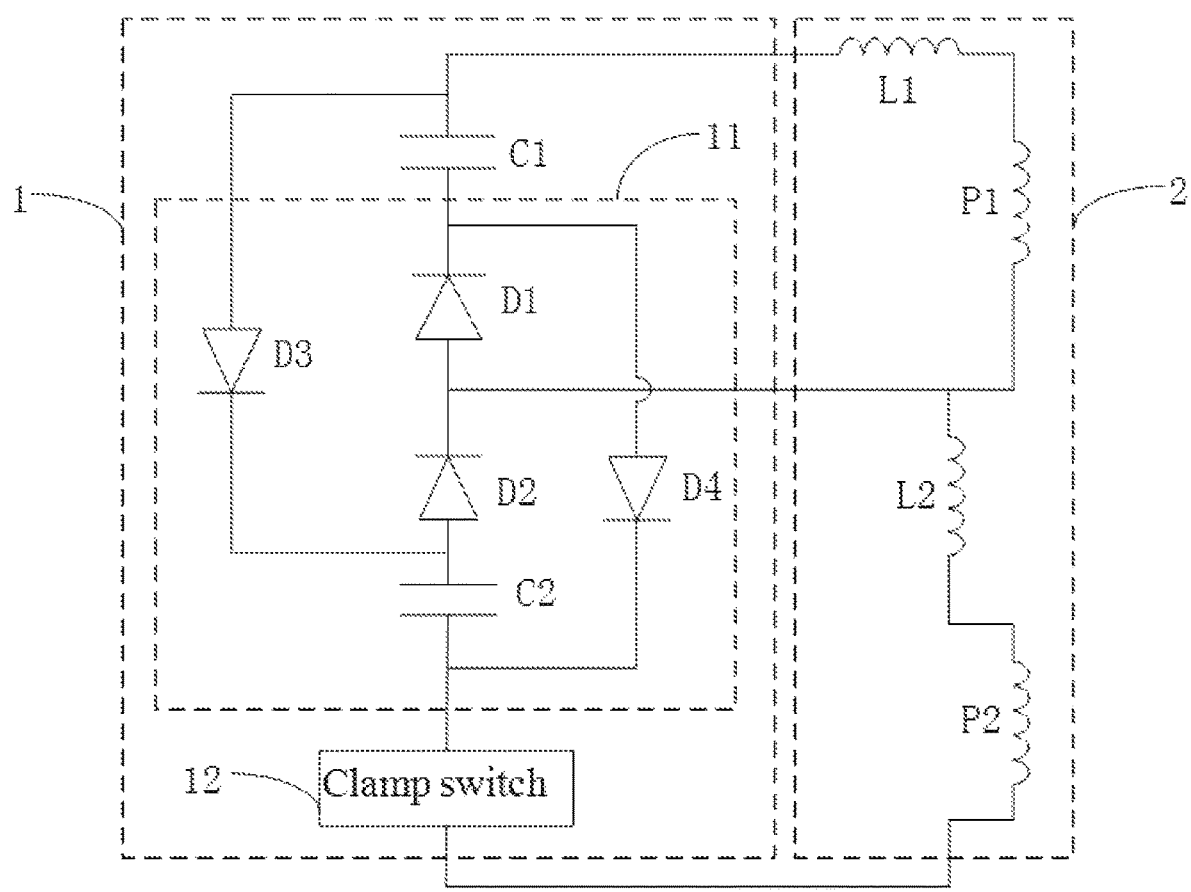
FIG. 4 is a structural schematic diagram 3 of a switching power supply in an embodiment of the present invention.

In an embodiment, with reference to FIG. 4, the path guiding module 11 may include a first diode D1 and a second diode D2.

The first terminal of the first clamp capacitor C1 is connected to the terminal of the first leakage inductance L1 away from the first primary winding P1, a cathode of the first diode D1 is connected to a second terminal of the first clamp capacitor C1, an anode of the first diode D1 is connected to a cathode of the second diode D2, the cathode of the second diode D2 is further connected to the terminal of the second leakage inductance L2 away from the second primary winding P2, an anode of the second diode D2 is connected to a first terminal of the second clamp capacitor C2, the second terminal of the second clamp capacitor C2 is connected to the first terminal of the clamp switch 12 (i.e., the clamp switch S2 shown in FIGS. 6 to 9), and the second terminal of the clamp switch 12 (i.e., the clamp switch S2 shown in FIGS. 6 to 9) is connected to the terminal of the second primary winding L2 away from the second leakage inductance L2.

In the first time period, the first leakage inductance L1, the first winding P1, the first diode D1, and the first clamp capacitor C1 form a loop, and further, the leakage inductance energy may be transferred to the first clamp capacitor C1; the second leakage inductance L2, the second winding P2, the body diode of the clamp switch 12, the second clamp capacitor C2 and the second diode form a loop, and further, the leakage inductance energy may be transferred to the second clamp capacitor C2.

With reference to FIG. 4, the path guiding module 11 further comprises a third diode D3 and a fourth diode D4;

an anode of the third diode D3 is connected to the first terminal of the first clamp capacitor C1, a cathode of the third diode D3 is connected to the first terminal of the second clamp capacitor C2, an anode of the fourth diode D4 is connected to the second terminal of the first clamp capacitor C1, and a cathode of the fourth diode D4 is connected to the second terminal of the second clamp capacitor C2.

In the second time period, the first terminals of the first clamp capacitor C1 and the second clamp capacitor C2 may be connected in parallel to the first terminal of the first leakage inductance, and the second terminal of the first clamp capacitor C1 and the second clamp capacitor C2 are connected in parallel to the first terminal of the clamp switch, so as to form a circuit state capable of discharging the first clamp capacitor C1 and the second clamp capacitor C2.

Figure 5:
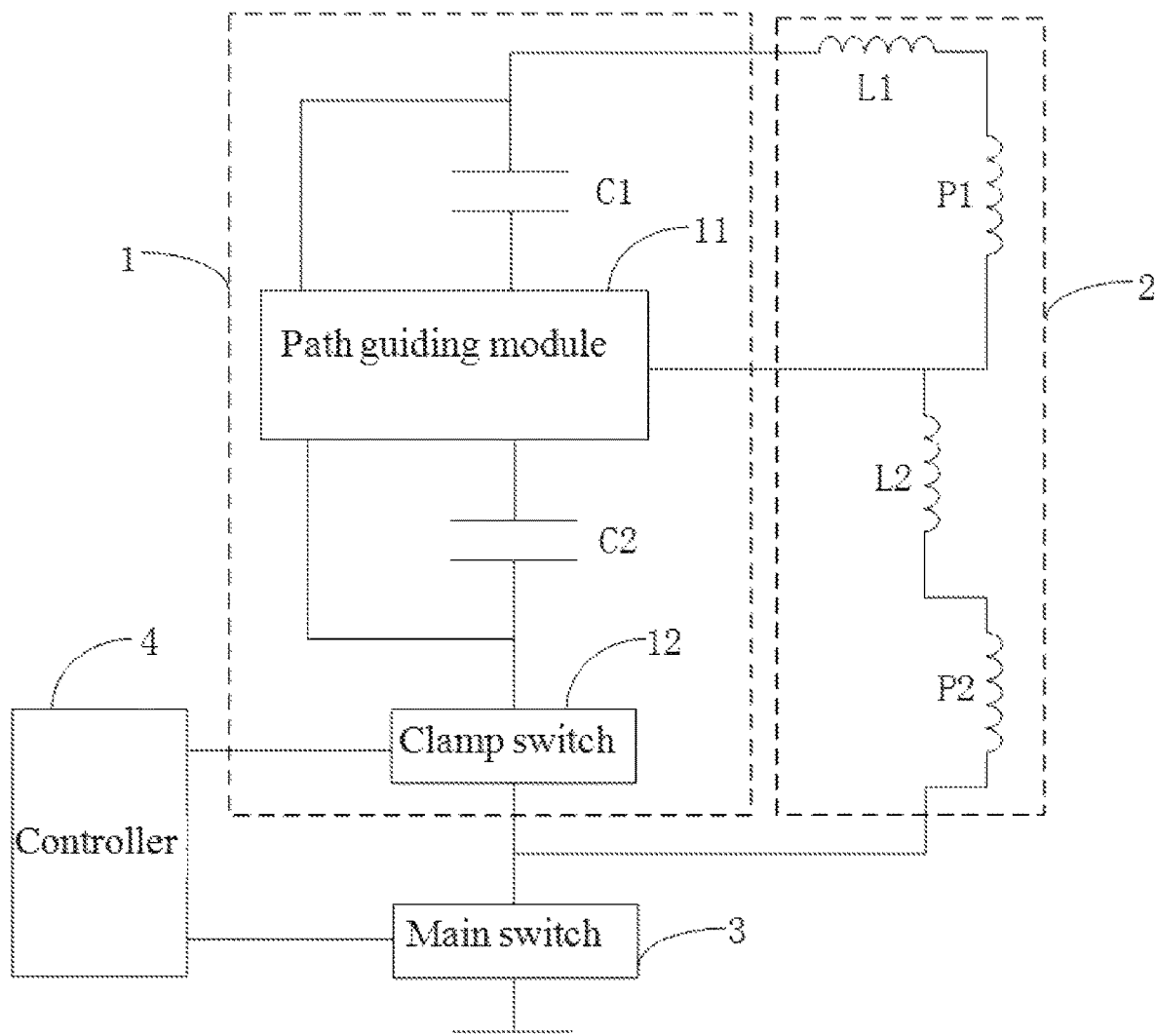
FIG. 5 is a structural schematic diagram 4 of a switching power supply in an embodiment of the present invention.
Figure 6:
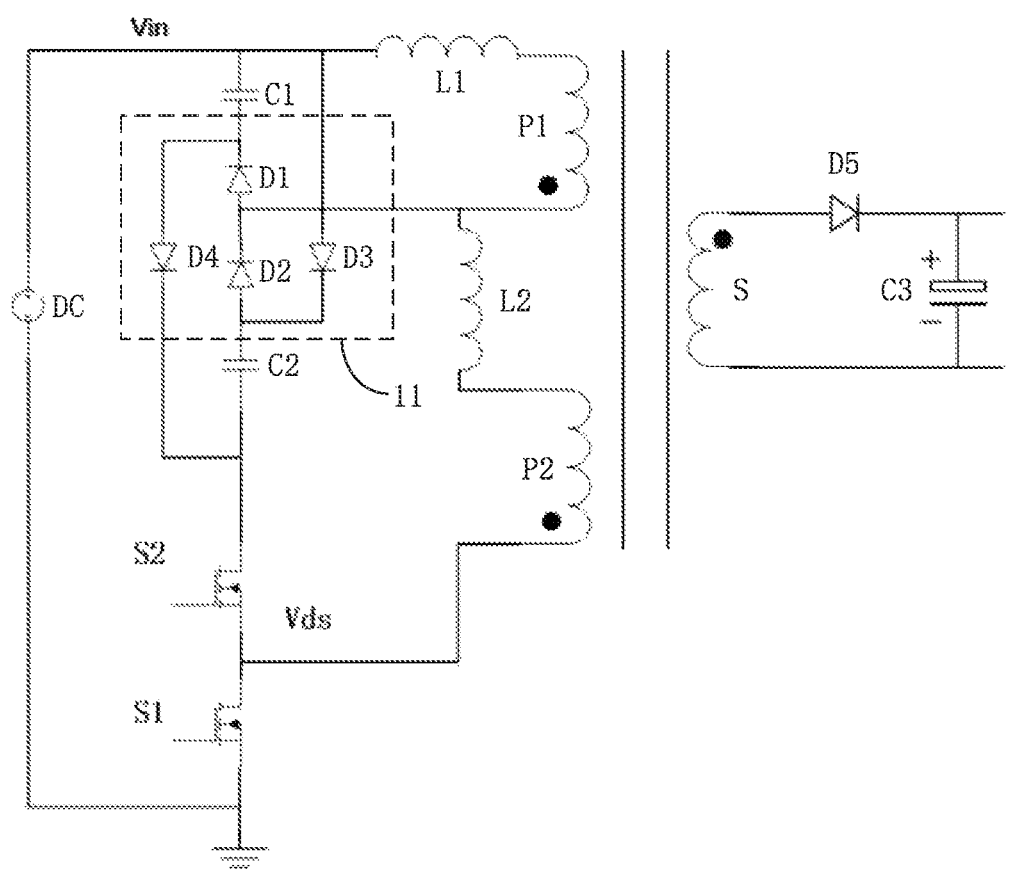
FIG. 6 is a circuit diagram of a switching power supply in an embodiment of the present invention.

In an embodiment, with reference to FIG. 5, the switching power supply further comprises a main switch 3 (i.e., the main switch S1 shown in FIGS. 6 to 9) and a controller 4, wherein a first terminal of the main switch 3 is connected to a second terminal of the second primary winding P2, a second terminal of the main switch 3 is grounded, and an output terminal of the controller 4 is connected to a control terminal of the main switch 3 and a control terminal of the clamp switch 12.

The input terminal of the controller 4 may further be connected to other positions in the circuit, so as to provide a basis for the control of the main switch 3 and the clamp switch 12.

When in the first time period, the main switch 3 is turned off, the clamp switch 12 is turned off, and an excitation energy on the primary side of the transformer is not completely released;

when in the second time period, the main switch 3 is turned off, the clamp switch 12 is turned on, and the excitation energy on the primary side of the transformer has been completely released.

Hereinafter, the control process of the switching power supply in an example will be described with reference to FIGS. 6-11. At the same time, in the following, S1 is used to characterize the main switch, and S2 is used to characterize the clamp switch. The relevant content can be understood with reference to the main switch 3 and the clamp switch 12 in the preceding text.

With reference to FIGS. 6 to 9, the first terminal of the first leakage inductance L1 may be connected to a direct current power supply DC; the voltage provided by the direct current power supply DC may be, for example, Vin; the direct current power supply DC may be, for example, rectified or generated by alternating current, or may be obtained directly. The output capacitor C3 may further be connected in parallel on the output side of the transformer.

Based on the circuit structure shown in FIGS. 6 to 9, the primary winding of the transformer is divided into two windings, i.e., the first primary winding P1 and the second primary winding P2; the leakage inductance is also divided into two parts, i.e., the first leakage inductance L1 and the second leakage inductance L2. The first clamp capacitor C1 and the first diode D1 form a clamp circuit of the first winding P1 and the first leakage inductance L1, the second diode D2 and the second clamp capacitor C2 form an absorption loop of the second winding P2 and the second leakage inductance L2, the third diode D3 forms a discharge loop of the second clamping capacitor C2, and the fourth diode D4 forms a discharge loop of the first clamping capacitor C1.

Figure 7:
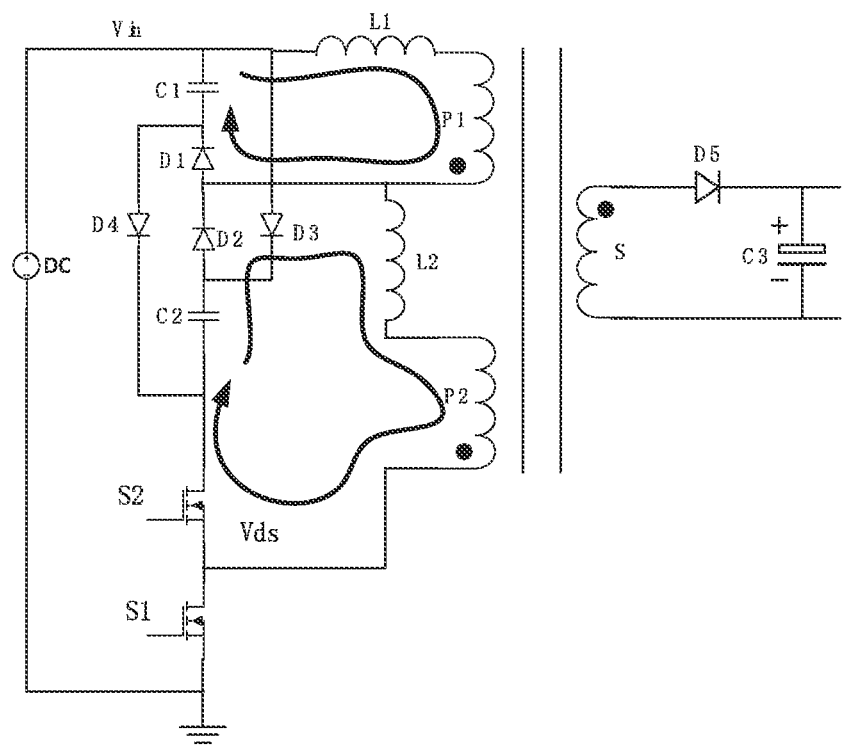
FIG. 7 is a circuit diagram showing a state when a clamp capacitor is charged in an embodiment of the present invention.

When the main switch S1 is turned off, the working principle of the circuit may refer to FIG. 7, wherein half of the primary current flows through the first leakage inductance L1, the first winding P1, the first diode D1, and the first clamping capacitor C1, the energy of the first leakage inductance L1 being stored in the first clamp capacitor C1, and the other half of the primary current flows through the second leakage inductance L2, the second winding P2, the body diode of the clamp switch S2, the second clamp capacitor C2 and the second diode D2, the energy of the second leakage inductance L2 is stored in the second clamp capacitor C2.

Figure 8:
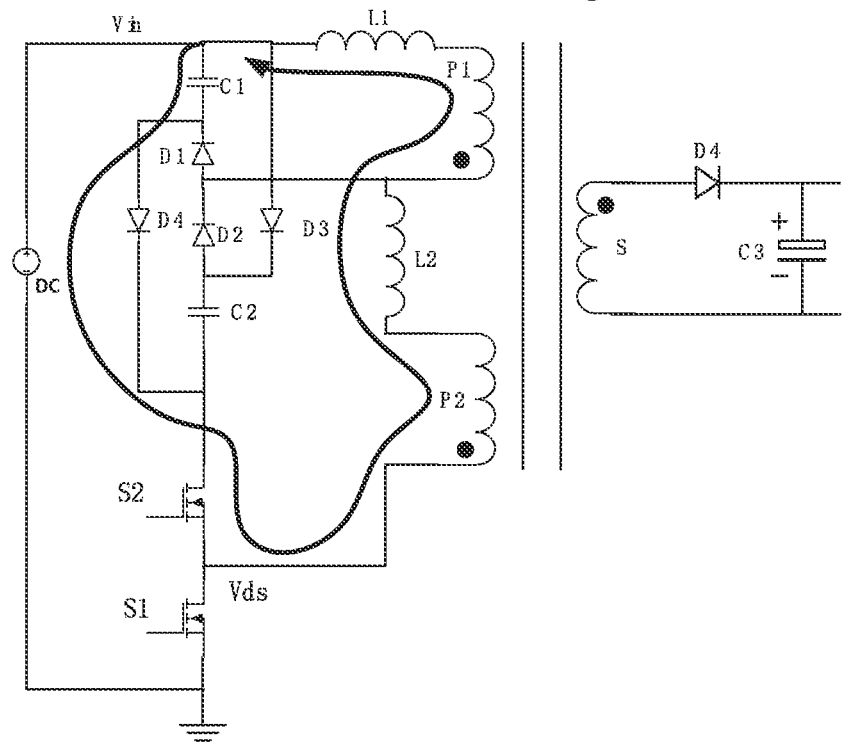
FIG. 8 is a circuit diagram 1 showing a state when a clamp capacitor is discharged in an embodiment of the present invention.
Figure 9:
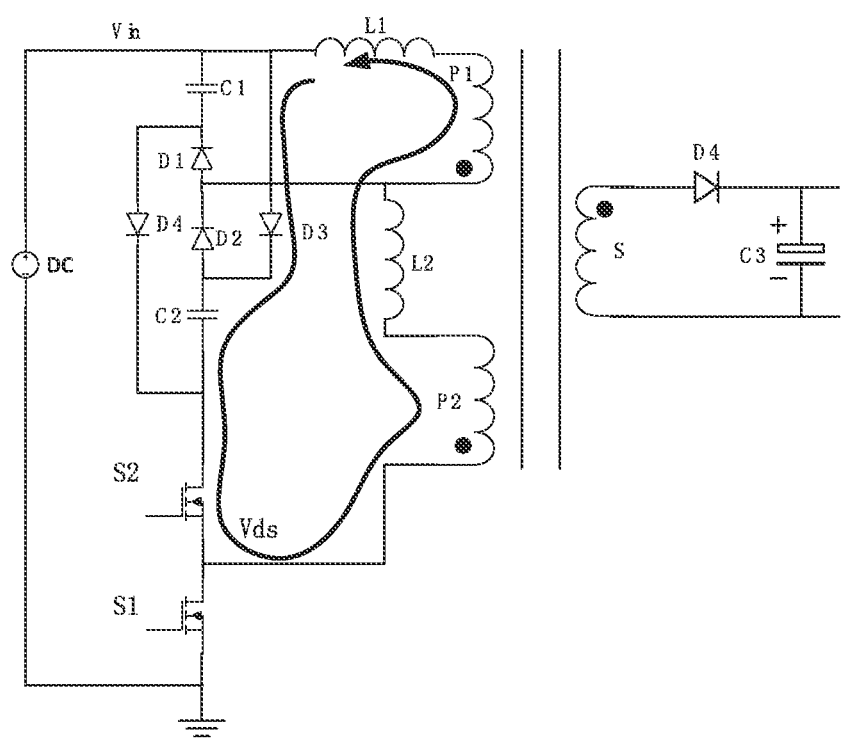
FIG. 9 is a circuit diagram 2 showing a state when a clamp capacitor is discharged in an embodiment of the present invention.

When the excitation energy is completely released to the secondary, the clamp switch S2 continues to conduct, and then the active clamp circuit reversely charges the magnetizing inductance and leakage inductance of the transformer through two paths, i.e.:

one path shown in FIG. 8: the first clamp capacitor C1—the fourth diode D4—the clamp switch S2—the second primary winding P2—the second leakage inductance L2—the first primary winding P1—first leakage inductance L1—the first clamp capacitor C1; the other path shown in FIG. 9: the second clamp capacitor C2—the clamp switch S2—the second primary winding P2—the second leakage inductance L2—the first primary winding P1—first leakage inductance L1—the third diode D3—the second clamp capacitor C2.

In an embodiment, the controller 4 shown in FIG. 5 is configured to: control the clamp switch to turn off if it is detected that voltages of the first clamp capacitor C1 and the second clamp capacitor C2 drop to a target voltage when the main switch S1 is turned off and the clamp switch S2 is turned on; the target voltage matches half of a secondary reflected voltage.

The input terminal of the controller 4 may be directly or indirectly connected to the first clamp capacitor and/or the second clamp capacitor to collect the voltage of the clamp capacitor, so as to provide a basis for the above judgment and processing. Regardless of the detection method, as long as the information about the voltage of the clamp capacitor may be obtained, it does not depart from the scope of the embodiment of the present invention.

In specific examples, when the voltages of the first clamp capacitor C1 and the second clamp capacitor C2 are released to half of the secondary reflected voltage (0.5*N*Vout), the clamp S2 is turned off, and then the leakage inductance energy of the first clamp capacitor C1 and the second clamp capacitor C2 is converted into excitation and leakage inductance current, i.e., converting the electrical energy into magnetic energy and sending them back to the power supply DC.

From the above description, it can be seen that when the main switch S1 is turned off, the first leakage inductance L1 charges the first clamp capacitor C1, and the second leakage inductance L2 charges the second clamp capacitor C2; when the leakage inductance energy is returned, the second clamp capacitor C2 and the first clamp capacitor C1 are connected in parallel. Therefore, the active clamp circuit may be understood as an active clamp in parallel mode.

The active clamp in parallel mode may be applied to two working modes in specific applications: CCM mode and DCM mode. For efficiency and to reduce standby power consumption during actual operation, a mixed operation of the two modes is possible. The operating frequency may further be divided into fixed frequency and variable frequency modes. For the same reason, a mixed operation of these two modes is possible.

The following will describe the operation of CCM mode (variable frequency) and DCM mode (fixed frequency) in combination with specific waveforms.

Figure 10:
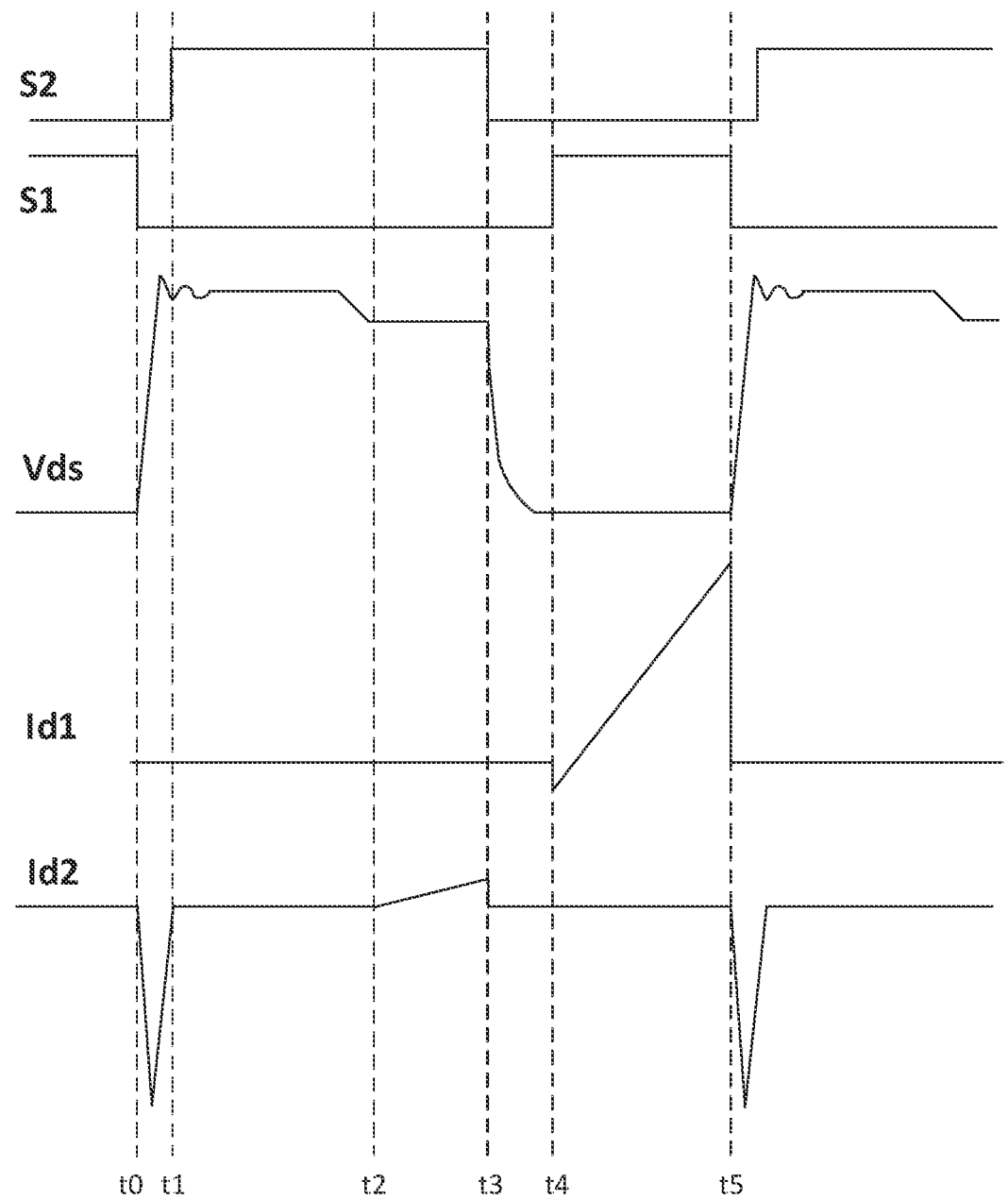
FIG. 10 is a signal diagram of CCM mode in an embodiment of the present invention.

With reference to FIG. 10, in the waveform of CCM mode, at t0, the main switch S1 is turned off, and the current of the second leakage inductance L2 flows through the body diode of the clamp switch S2 and enters the second clamp capacitor C2 for storage, the current of the first leakage inductance L1 enters the first clamp capacitor C1 through the first diode D1 for storage, and the clamp switch S2 may be turned on after a certain time delay (i.e., the delay time period) after t0; at t1, the leakage inductance energy is released and the excitation current is commutated to the secondary; at t2, the excitation energy is released, and the first clamp capacitor C1 and the second clamp capacitor C2 are connected in parallel to discharge the excitation inductance; at t3, the clamp switch S2 is turned off, and a drain current Id2 of the main switch S1 will discharge a source-drain voltage Vds of the main switch S1 at this time; at t4, the source-drain voltage Vds reaches zero, and the main switch S1 is turned on to achieve zero voltage switch (ZVS); at t5, the next cycle starts. When the load and input voltage are different, the time t1-t2 and t4-t5 will change, so the frequency will also change. When the main switch S1 may not achieve ZVS for some reasons, the time t2-t3 may be adjusted accordingly.

To realize the action of turning on the clamp switch in the above processes, when in the continuous current mode (CCM), the controller 4 shown in FIG. 5 may be configured to:

control the main switch to turn off when the clamp switch is turned off, wait for a delay time period, and then control the clamp switch to turn on, the first time period being a time period for waiting for the delay time period.

Figure 11:
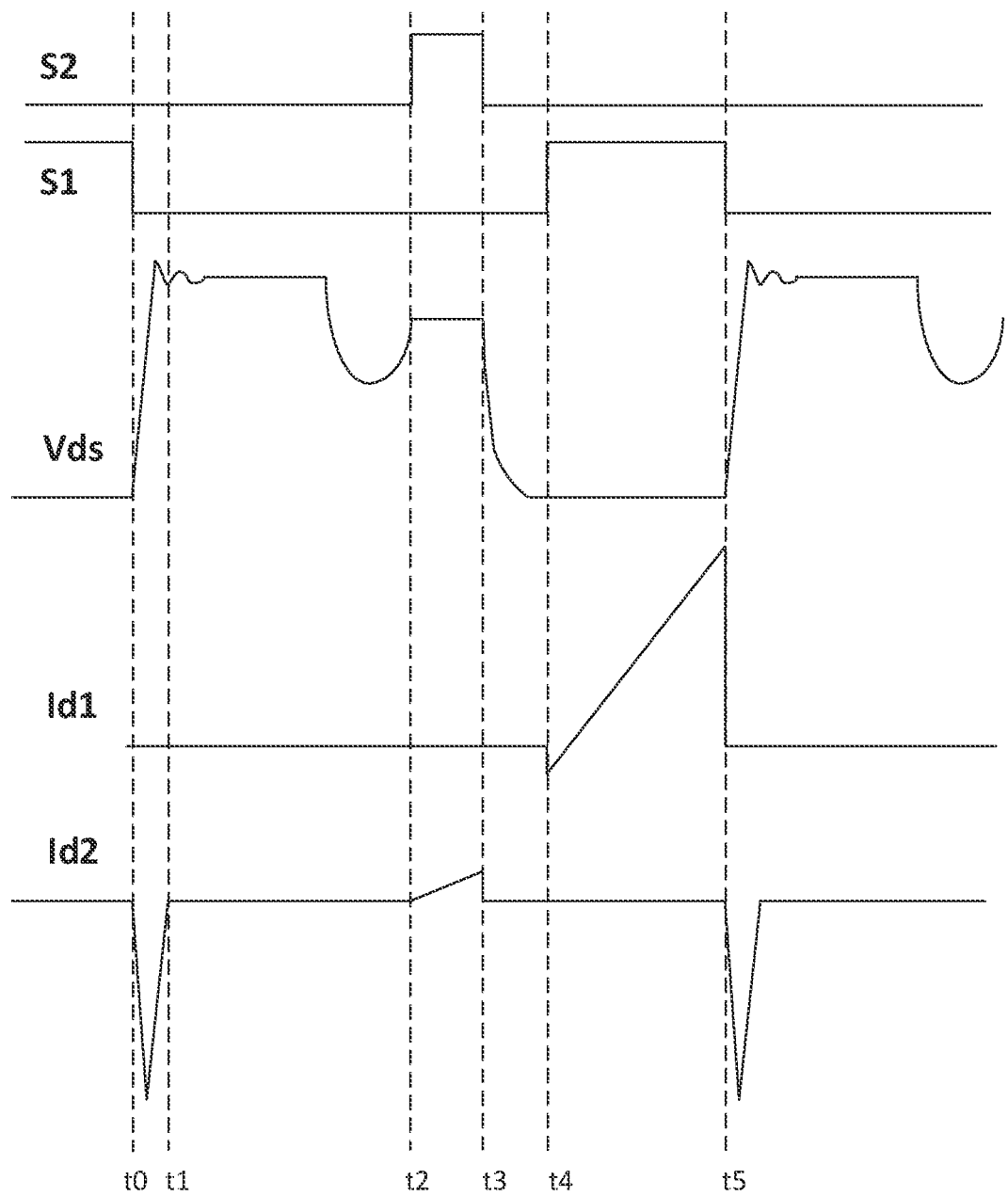
FIG. 11 is a signal diagram of CDM mode in an embodiment of the present invention.

With reference to FIG. 11, most of the waveforms in DCM mode are similar to CCM mode, except in that the time of turning on the clamp switch S2 is at the peak value of the free oscillation of the source-drain voltage Vds, which can operate at the first, second, third, and fourth peaks or may operate without the peaks while the clamp switch S2 having some turn-on losses. When the main switch S1 may not achieve ZVS for some reasons, the time t2-t3 may be adjusted to ensure that the main switch S1 achieves ZVS; since the time change is relatively small, the frequency may be basically kept constant.

To realize the action of turning on the clamp switch in the above processes, when in the discontinuous current mode (DCM), the controller 4 shown in FIG. 5 may be configured to:

control the main switch to turn off when the clamp switch is turned off, and to control the clamp switch to turn on when a source-drain voltage of the main switch reaches an N-th peak value, wherein N is an integer greater than or equal to 1, the first time period being a time period in which the excitation energy on the primary side of the transformer is not completely released in a time period after the main switch is turned off and before the clamp switch is turned on.

The input terminal of the controller 4 may obtain the information of the source and drain voltage of the main switch, which may be obtained by directly or indirectly detecting the main switch; no matter what method is used for detection, as long as the information may be obtained, it does not depart from the scope of the embodiment of the present invention.

Further, In FIGS. 10 and 11, Id1 refers to the drain current of the main switch S1, and Id2 refers to the drain current of the clamp switch S2.

An embodiment of the present invention provides an electronic device, including the switching power supply involved in the above options.

In the switching power supply and the electronic device provided by the embodiment of the present invention, by introducing the path guide module in the active clamp circuit and using two clamp capacitors, the two clamp capacitors may be discharged in parallel when the active clamp circuit is discharged, which effectively limits the current during discharge and avoids or reduces the damage of the device caused by excessive pulse current.

At the same time, compared with the solution in which the electric energy is obtained from a circuit position of the transformer after two clamp capacitors are connected in series (e.g., after two capacitors are connected in series, the electric energy is obtained from a single leakage inductance and winding), the two clamp capacitors in the present invention obtain electric energy from different positions respectively, so as to further facilitate reducing the selection requirement of the clamp capacitor.

At last, it should be noted that the above various embodiments are only used to describe the technical solutions of the present invention, rather than limiting the technical solutions of the present invention. Even through the present invention is described in detail with reference to the foregoing embodiments, those of ordinary skilled in the art should understand that they can still modify the technical solutions recorded in the foregoing various embodiments or equivalently replace some or all of the technical features. However, these modifications or replacements do not make the essence of the corresponding technical solutions deviate from the scope of the technical solutions of the embodiments of the present invention.

What is claimed is:

1. A switching power supply, comprising an active clamp circuit and a transformer, the active clamp circuit comprising a first clamp capacitor and a second clamp capacitor, wherein the active clamp circuit further comprises a path guiding module; the path guiding module is connected at two terminals of the first clamp capacitor and two terminals of the second clamp capacitor respectively; the path guiding module, the first clamp capacitor, and the second clamp capacitor are all directly or indirectly connected to a primary side of the transformer;

the path guiding module is configured to:
  in a first time period, guide the first clamp capacitor and the second clamp capacitor to obtain an electric energy from different positions on the primary side of the transformer;
  in a second time period, guide the first clamp capacitor and the second clamp capacitor to discharge the primary side of the transformer after being connected in parallel with each other.

2. The switching power supply according to claim 1, wherein the active clamp circuit further comprises a clamp switch, and the primary side of the transformer comprises a first leakage inductance, a first primary winding, a second leakage inductance, and a second primary winding that are connected in sequence;
  a first terminal of the first clamp capacitor is connected to a first terminal of the first leakage inductance away from the first primary winding, a second terminal of the second clamp capacitor is connected to a first terminal of the clamp switch, a second terminal of the clamp switch is connected to a second terminal of the second primary winding away from the second leakage inductance, and the path guiding module is connected to a first terminal of the second leakage inductance away from the second primary winding;
  the path guiding module is specifically configured to:
    guide the first clamp capacitor to obtain the electric energy from the first leakage inductance and the first primary winding, and guide the second clamp capacitor to obtain the electric energy from the second leakage inductance and the second primary winding in the first time period;
  guide the first clamp capacitor and the second clamp capacitor to discharge the first leakage inductance, the first primary winding, the second leakage inductance and the second primary winding after being connected in parallel with each other in the second time period.

3. The switching power supply according to claim 2, wherein the path guiding module comprises a first diode and a second diode;
  the first terminal of the first clamp capacitor is connected to the first terminal of the first leakage inductance, a cathode of the first diode is connected to a second terminal of the first clamp capacitor, an anode of the first diode is connected to a cathode of the second diode, the cathode of the second diode is further connected to the terminal of the second leakage inductance away from the second primary winding, an anode of the second diode is connected to a first terminal of the second clamp capacitor, the second terminal of the second clamp capacitor is connected to the first terminal of the clamp switch, and the second terminal of the clamp switch is connected to the second terminal of the second primary winding.

4. The switching power supply according to claim 3, further comprising a main switch and a controller, wherein a first terminal of the main switch is connected to the second terminal of the second primary winding, a second terminal of the main switch is grounded, and an output terminal of the controller is connected to a control terminal of the main switch and a control terminal of the clamp switch;
  in the first time period, the main switch is turned off, the clamp switch is turned off, and an excitation energy on the primary side of the transformer is not completely released;
  in the second time period, the main switch is turned off, the clamp switch is turned on, and the excitation energy on the primary side of the transformer has been completely released.

5. The switching power supply according to claim 4, wherein when in a continuous conduction mode, the controller is configured to:
  control the main switch to turn off when the clamp switch is turned off, wait for a delay time period, and then control the clamp switch to turn on, wherein the first time period being a time period for waiting for the delay time period.

6. The switching power supply according to claim 3, wherein the transformer further comprises a secondary winding, and the secondary winding is sandwiched between the first primary winding and the second primary winding to form a sandwich winding transformer.

7. The switching power supply according to claim 2, wherein the path guiding module further comprises a third diode and a fourth diode;
  an anode of the third diode is connected to the first terminal of the first clamp capacitor, a cathode of the third diode is connected to the first terminal of the second clamp capacitor, an anode of the fourth diode is connected to the second terminal of the first clamp capacitor, and a cathode of the fourth diode is connected to the second terminal of the second clamp capacitor.

8. The switching power supply according to claim 7, further comprising a main switch and a controller, wherein a first terminal of the main switch is connected to the second terminal of the second primary winding, a second terminal of the main switch is grounded, and an output terminal of the controller is connected to a control terminal of the main switch and a control terminal of the clamp switch;

in the first time period, the main switch is turned off, the clamp switch is turned off, and an excitation energy on the primary side of the transformer is not completely released;

in the second time period, the main switch is turned off, the clamp switch is turned on, and the excitation energy on the primary side of the transformer has been completely released.

9. The switching power supply according to claim 8, wherein when in a continuous conduction mode, the controller is configured to:

control the main switch to turn off when the clamp switch is turned off, wait for a delay time period, and then control the clamp switch to turn on, wherein the first time period being a time period for waiting for the delay time period.

10. The switching power supply according to claim 7, wherein the transformer further comprises a secondary winding, and the secondary winding is sandwiched between the first primary winding and the second primary winding to form a sandwich winding transformer.

11. The switching power supply according to claim 2, further comprising a main switch and a controller, wherein a first terminal of the main switch is connected to the second terminal of the second primary winding, a second terminal of the main switch is grounded, and an output terminal of the controller is connected to a control terminal of the main switch and a control terminal of the clamp switch;

in the first time period, the main switch is turned off, the clamp switch is turned off, and an excitation energy on the primary side of the transformer is not completely released;

in the second time period, the main switch is turned off, the clamp switch is turned on, and the excitation energy on the primary side of the transformer has been completely released.

12. The switching power supply according to claim 11, wherein when in a continuous conduction mode, the controller is configured to:

control the main switch to turn off when the clamp switch is turned off, wait for a delay time period, and then control the clamp switch to turn on, wherein the first time period being a time period for waiting for the delay time period.

13. The switching power supply according to claim 12, wherein when in a discontinuous conduction mode, the controller is configured to:

control the main switch to turn off when the clamp switch is turned off, and to control the clamp switch to turn on when a source-drain voltage of the main switch reaches an N-th peak value, wherein N is an integer greater than or equal to 1, and the first time period being a time period in which the excitation energy on the primary side of the transformer is not completely released in a time period after the main switch is turned off and before the clamp switch is turned on.

14. The switching power supply according to claim 12, wherein the controller is configured to:

control the clamp switch to turn off if it is detected that voltages of the first clamp capacitor and the second clamp capacitor drop to a target voltage when the main switch is turned off and the clamp switch is turned on, wherein the target voltage matches half of a secondary reflected voltage.

15. The switching power supply according to claim 2, wherein the transformer further comprises a secondary winding, and the secondary winding is sandwiched between the first primary winding and the second primary winding to form a sandwich winding transformer.

16. An electronic device, comprising the switching power supply according to any one of claim 1.

17. The electronic device according to claim 16, wherein the active clamp circuit further comprises a clamp switch, and the primary side of the transformer comprises a first leakage inductance, a first primary winding, a second leakage inductance, and a second primary winding that are connected in sequence;

a first terminal of the first clamp capacitor is connected to a first terminal of the first leakage inductance away from the first primary winding, a second terminal of the second clamp capacitor is connected to a first terminal of the clamp switch, a second terminal of the clamp switch is connected to a second terminal of the second primary winding away from the second leakage inductance, and the path guiding module is connected to a first terminal of the second leakage inductance away from the second primary winding;

the path guiding module is specifically configured to:

guide the first clamp capacitor to obtain the electric energy from the first leakage inductance and the first primary winding, and guide the second clamp capacitor to obtain the electric energy from the second leakage inductance and the second primary winding in the first time period;

guide the first clamp capacitor and the second clamp capacitor to discharge the first leakage inductance, the first primary winding, the second leakage inductance and the second primary winding after being connected in parallel with each other in the second time period.

18. The electronic device according to claim 16, wherein the path guiding module comprises a first diode and a second diode;

the first terminal of the first clamp capacitor is connected to the first terminal of the first leakage inductance, a cathode of the first diode is connected to a second terminal of the first clamp capacitor, an anode of the first diode is connected to a cathode of the second diode, the cathode of the second diode is further connected to the first terminal of the second leakage inductance, an anode of the second diode is connected to a first terminal of the second clamp capacitor, the second terminal of the second clamp capacitor is connected to the first terminal of the clamp switch, and the second terminal of the clamp switch is connected to the second terminal of the second primary winding.

19. The electronic device according to claim 16, wherein the path guiding module further comprises a third diode and a fourth diode;

an anode of the third diode is connected to the first terminal of the first clamp capacitor, a cathode of the third diode is connected to the first terminal of the second clamp capacitor, an anode of the fourth diode is connected to the second terminal of the first clamp capacitor, and a cathode of the fourth diode is connected to the second terminal of the second clamp capacitor.

20. The electronic device according to claim 16, wherein further comprising a main switch and a controller, wherein a first terminal of the main switch is connected to the second terminal of the second primary winding, a second terminal of the main switch is grounded, and an output terminal of the controller is connected to a control terminal of the main switch and a control terminal of the clamp switch;
   in the first time period, the main switch is turned off, the clamp switch is turned off, and an excitation energy on the primary side of the transformer is not completely released;
   in the second time period, the main switch is turned off, the clamp switch is turned on, and the excitation energy on the primary side of the transformer has been completely released.

* * * * *